(12) United States Patent
Zeng et al.

(10) Patent No.: US 11,628,390 B2
(45) Date of Patent: Apr. 18, 2023

(54) DUST REMOVAL FILTER CARTRIDGE

(71) Applicant: Guangzhou Farrleey Filtration Co., Ltd., Guangdong (CN)

(72) Inventors: Zhisong Zeng, Guangdong (CN); Jin Wang, Guangdong (CN); Xianfu Zeng, Guangdong (CN)

(73) Assignee: Guangzhou Farrleey Filtration Co., Ltd., Guangzhou (CN)

( * ) Notice: Subject to any disclaimer, the term of this patent is extended or adjusted under 35 U.S.C. 154(b) by 323 days.

(21) Appl. No.: 17/004,010

(22) Filed: Aug. 27, 2020

(65) Prior Publication Data

US 2021/0394109 A1    Dec. 23, 2021

(30) Foreign Application Priority Data

Jun. 17, 2020   (CN) .......................... 202021133338.1

(51) Int. Cl.
*B01D 46/24* (2006.01)
*B01D 46/00* (2022.01)
*B01D 46/52* (2006.01)

(52) U.S. Cl.
CPC ...... *B01D 46/2411* (2013.01); *B01D 46/0005* (2013.01); *B01D 46/522* (2013.01); *B01D 2265/04* (2013.01)

(58) Field of Classification Search
CPC ............ B01D 46/2411; B01D 46/0005; B01D 46/522; B01D 2265/04; B01D 46/523
USPC ........................................................... 55/498
See application file for complete search history.

(56) References Cited

U.S. PATENT DOCUMENTS

| 6,099,729 A * | 8/2000 | Cella ...................... B01D 29/21 |
| | | 210/493.2 |
| 2021/0069628 A1* | 3/2021 | Tee ....................... B01D 29/232 |

FOREIGN PATENT DOCUMENTS

CN    204073718 U    1/2015

* cited by examiner

*Primary Examiner* — Robert A Hopkins
*Assistant Examiner* — Qianping He

(57) ABSTRACT

The invention relates to the technical field of filtering equipment, and discloses a dust removal filter cartridge. The dust removal filter cartridge includes a filter material and a filter net arranged in the filter material. A top cover is arranged on a top end of the filter material, and an air outlet is provided in the top cover. A bottom end of the filter material is sealed with a bottom cover. An inner side of the filter material is provided with binding tapes which are adhesively fixed on the filter material. An outer surface of the filter material is an effective filtering surface for dust removal, and the binding tapes are arranged on the inner side of the filter material. During the dust removal process, filtering area of an outer surface of a filter paper increases, and the filtering effect is good.

10 Claims, 3 Drawing Sheets

DUST REMOVAL FILTER CARTRIDGE

CROSS REFERENCE TO RELATED APPLICATIONS

The present application claims the benefit of Chinese Patent Application No. 202021133338.1 filed on Jun. 17, 2020, the contents of which are incorporated herein by reference in their entirety.

FIELD OF THE INVENTION

The invention relates to the field of filtering equipment, and in particular to a dust removal filter cartridge.

BACKGROUND OF THE INVENTION

Dust removers are common dust removal equipment, which are widely used in cement, steel, electric power, food, metallurgy and other fields. Filter cartridges are commonly used components in the dust removers. A traditional dust removal filter element includes a filter material, a filter net, end covers, a binding tape, and other components. The outer periphery of the filter material is provided with the binding tape, and the binding tape and the filter material are bonded through hot melting. The filter material is folded at a constant fold distance, so that the filter material is not easily deformed during the pulse jet dust-cleaning process. In existing methods of producing a filter cartridge, generally, the filter material is folded, one end of the binding tape is sewed to the filter material, then the binding tape is glued on an inner side and wrapped around the filter cartridge. After the glue is solidified, the distance is fixed.

A Chinese patent, with the number of announcement of grant of patent of CN204073718U and the date of announcement of grant of patent of Jan. 7, 2015, discloses a filter cartridge, which includes an annular top cover and a bottom cover, wherein a sealing ring is arranged above the top cover; a cylindrical fold-shaped filter material is arranged between the top cover and the bottom cover; an inner net is arranged on the inner side of the filter material; a binding tape is arranged outside the filter material; one end of the binding tape is fixed to a joint of the filter material, and the other end of the binding tape is connected with the binding tape through rivets; the binding tape is fixed to the filter material through a bonding glue.

The above-mentioned filter cartridge uses the tiny air-permeable structure in the filter material to block particulate matters in the gas. However, the binding tape of the filter cartridge is arranged on the outer side of the filter material, and is fixed to the filter material by a bonding glue. After long term use, the accumulated dust on the outer side of the filter material increases, and since the binding tape arranged on the outer side of the filter material provides vertical support for the dust, the dust is easy to accumulate near the binding tape, which reduces the filtering air volume and increases the wind resistance of the filter cartridge, affecting the service life and dust removal effect of the entire dust removal filter cartridge. In addition, the air pressure for cleaning dust when pulse jet is performed to the filter cartridge increased, which increases maintenance costs.

SUMMARY OF THE INVENTION

An objective of the invention is to provide a dust removal filter cartridge, so as to solve the problems existing in the prior art that: the dust is easy to accumulate near the binding tape of the filter cartridge since the binding tape is arranged on the outer side of the filter material, so that the filtering air volume is reduced and the wind resistance of the filter cartridge is increased, affecting the service life and dust removal effect of the entire dust removal filter cartridge; in addition, the air pressure for cleaning dust when pulse jet is performed to the filter cartridge increased, which increases maintenance costs.

In order to achieve the abovementioned objective, the invention provides a dust removal filter cartridge which includes a filter material and a filter net arranged in the filter material; wherein a top cover is arranged on a top end of the filter material, and an air outlet is provided in the top cover; a bottom end of the filter material is covered with a bottom cover for sealing, an inner side of the filter material is provided with binding tapes which are fixedly connected to the filter material at equal intervals through hot melting.

In a preferable embodiment, the binding tapes include main bodies arranged at the filter material at equal intervals through hot melting, and two ends of the main body are a first end and a second end going beyond the filter material; the first end is longer than the second end; the first end is connected with a joint of the filter material, and the second end is connected with an inner side of the first end.

In a preferable embodiment, the first end is connected with the filter material through hot melting, and the second end is connected with the first end and the filter material through hot melting.

In a preferable embodiment, the filter material is configured as a W-shaped folded filter paper.

In a preferable embodiment, radial gaps are provided between the filter net and the binding tapes.

In a preferable embodiment, a plurality of the binding tapes are arranged at intervals along the axial direction of the filter material, and distances between two adjacent binding tapes are equal.

In a preferable embodiment, the top cover and the filter material, and the bottom cover and the filter material are respectively bonded and sealed by a glue.

The dust removal filter cartridge according to an embodiment of the invention has the following beneficial effects in comparison with the prior art: an outer surface of the filter material is an effective filtering surface for dust removal, and the binding tapes are arranged on the inner side of the filter material; during the dust removal process, filtering area of an outer surface of a filter paper increases, and the filtering effect is good; moreover, the filter material is flat in the axial direction, and the dust is not supported in the axial direction of the filter material, which reduces dust accumulation at positions of the binding tapes, improves filtering air volume and reduces a wind resistance of filtering airflow; in addition, when pulse jet is outwardly performed from the inner side of the filter material for blowing off dust, there is less accumulated dust, and the wind resistance of the dust removal is small, which reduces maintenance costs.

Figure 1:
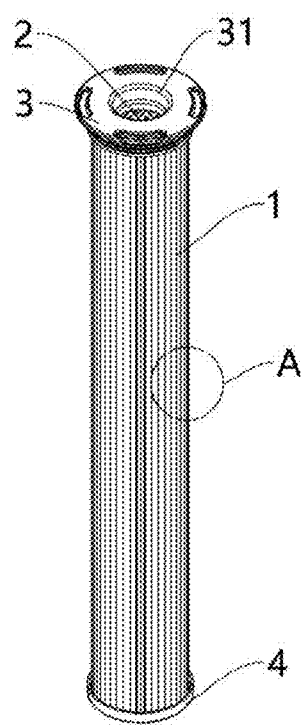
FIG. 1 is a schematic view of the structure of a dust removal filter cartridge according to the invention.
Figure 2:
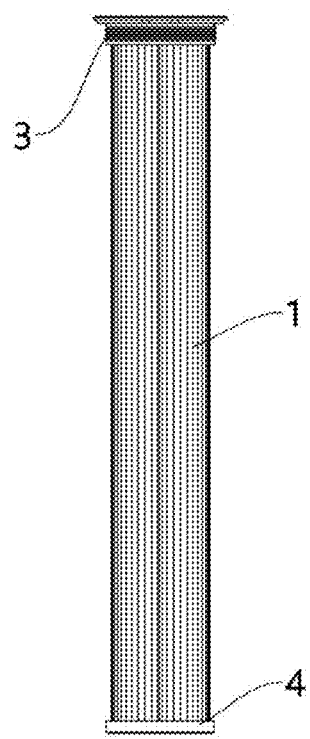
FIG. 2 is a front view of the dust removal filter cartridge of FIG. 1.
Figure 3:
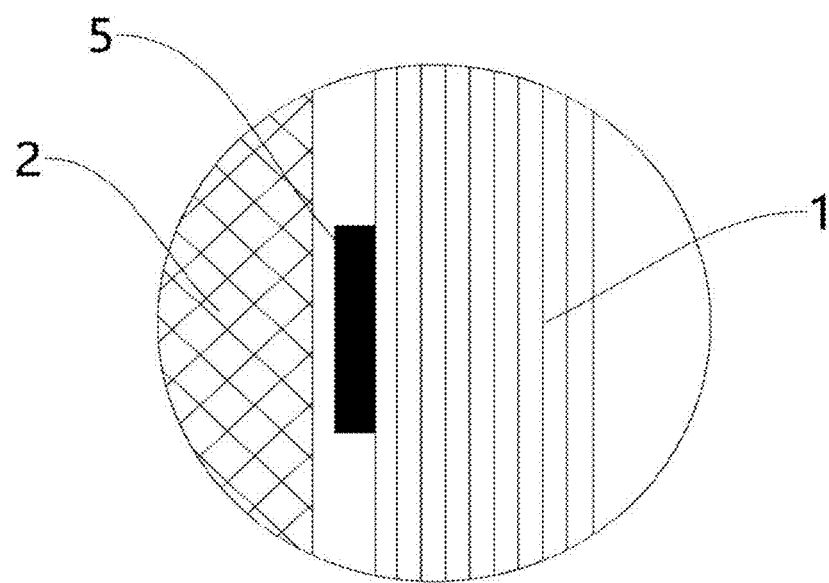
FIG. 3 is a partial cross-sectional view of Part A of the dust removal filter cartridge of FIG. 1.
Figure 4:
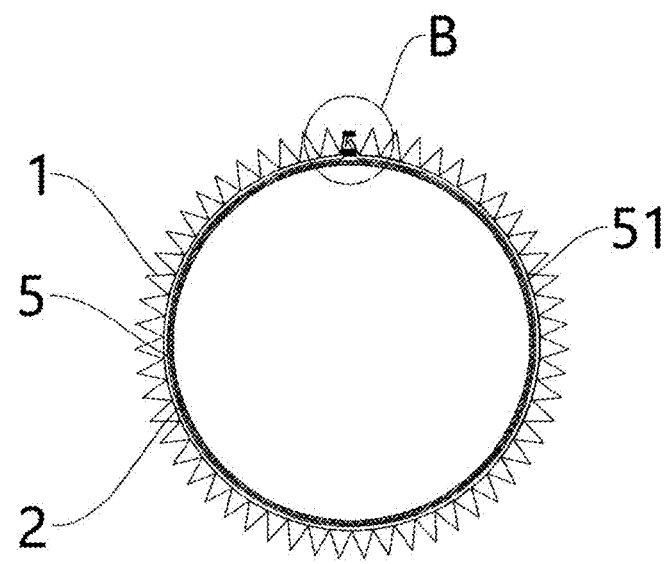
FIG. 4 is a cross-sectional view of the dust removal filter cartridge of FIG. 1 at a binding tape.

In the figures: 1, filter material; 2, filter net; 3, top cover; 31, air outlet; 4, bottom cover; 5, binding tape; 51, main body; 52, first end; and 53, second end.

DETAILED DESCRIPTION OF PREFERRED EMBODIMENTS

The specific implementation modes of the invention will be described in further detail below with reference to the drawings and embodiments. The following embodiments are used to illustrate the invention, but not to limit the scope of the invention.

A preferred embodiment of a dust removal filter cartridge according to the invention is shown in FIGS. 1 to 5. The dust removal filter cartridge includes a filter material 1, a filter net 2, a top cover 3, a bottom cover 4, and binding tapes 5. The filter material 1 is in a cylindrical structure. The filter material 1 is a filter paper folded in a W shape. The filter paper is folded, then is rolled to a cylindrical shape. Two ends of the filter paper are connected through ultrasonic hot melting, so as to form a stable cylindrical structure. The filtering surface of the filter paper is W-shaped, which can increase filtering area. On the other hand, distances between two adjacent folds of the filter paper are equal, which can reduce the resistance of filtration and facilitate dust removal.

The top cover 3 is fixed to the top end of the filter material 1 through glue bonding. Since the filter material 1 is sealed with the top cover 3 through glue bonding, the glue bonding can increase connection strength and sealing property between the top cover 3 and the filter material 1, which prevents air with dust from leaking out of the connection between the top cover 3 and the filter material 1. The top cover 3 is also provided with an air outlet 31 coaxial with the filter material 1. The filtered clean air enters an inner net through the filter material 1, and is finally discharged from the air outlet 31 in the top cover 3. The bottom cover 4 is fixed to the bottom end of the filter material 1 through glue bonding. Since the filter material 1 is sealed with the bottom cover 4 through glue bonding, the glue bonding is used to increase connection strength and sealing property between the bottom cover 4 and the filter material 1, which avoids air leakage at the bottom cover 4.

The binding tapes 5 are provided at the inner side of the filter material 1, and fixed to the filter material 1 through ultrasonic hot melting. There are a plurality of binding tapes 5 which are provided at intervals along the axial direction of the filter material 1. The distances between two adjacent binding tapes 5 are equal. In other words, the plurality of binding tapes 5 are fixedly bonded to the inner side of the filter material 1 at equal intervals.

The binding tapes 5 are of a strip structure, and the material thereof is a woven tape. Each of the binding tape 5 includes a main body 51, a first end 52, and a second end 53. The main bodies 51 and the filter material 1 are fixedly connected at equal intervals through hot melting. In other words, the main bodies 51 are fixedly connected with the filter material 1 at equal intervals along the circumferential direction of the filter material 1 to ensure hot-melt strength between the main bodies 51 and the filter material 1. The first end 52 and the second end 53 are two ends of the main body 51 of the binding tape 5 extending beyond the joint of the filter material 1. In other word, the first end 52 and the second end 53 are parts of the binding tape 5 going beyond the circumference of the main body 51. The length of the first end 52 is greater than that of the second end 53.

Figure 5:
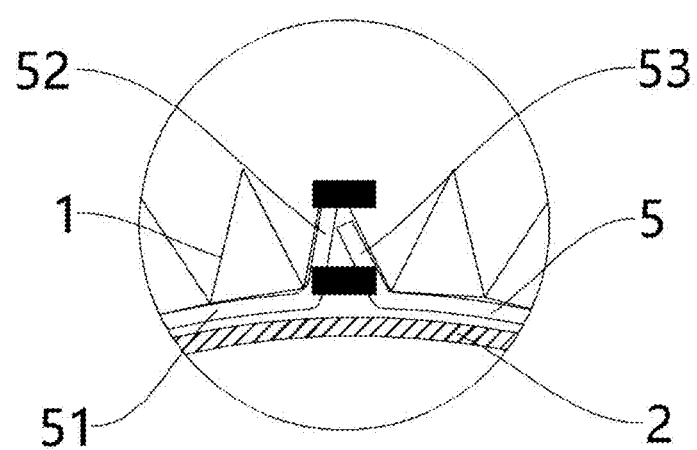
FIG. 5 is an enlarged schematic view of Part B of the dust removal filter cartridge of FIG. 4.

Refer to FIG. 5. The solid filling portion is in a hot-melt bonding structure. The first end 52 is connected with the joint of the filter material 1 through hot melting. That is, two ends of the filter material 1 at the joint are connected with the first end 52 through hot melting. After the first end 52 is fixedly bonded to the joint of the filter material 1 through hot melting, the second end 53 is fixedly bonded to the first end 52 and the inner side of the filter material 1 through hot melting. The first end 52 and the second end 53 of the binding tape 5 are fixedly connected to the filter material 1 through two hot melting processes, which can increase structural strength between the binding tapes 5 and the filter material 1 and enhance the structure of the entire filter cartridge, ensuring stability of the filter cartridge during the blowing process. In other embodiments, the first end 52 and the second end 53, and the first end 52 and the filter material 1 may also be fixedly connected by rivets.

The filter net 2 is coaxially arranged in the filter material 1. The filter net 2 is a metal filter net, so it plays a supporting role. Radial gaps are formed between the binding tapes 5 and the filter net 2. During the process of manufacturing the filter cartridge, the filter net 2 is easy to contact the filter material 1 when it is placed in the filter material 1, thereby damaging the inner surface of the filter paper. The binding tapes 5 are arranged at the inner side of the filter material 1, since the binding tapes 5 have a certain thickness and radial gaps are formed between the binding tapes 5 and the filter net 2, a certain radial space is formed between the filter net 2 and the filter material 1. The radial space can not only reduce the friction between the filter net 2 and the filter material 1, but also increase air fluidity, making air flow smoother and reducing resistance of the air flow.

To sum up, in the dust removal filter cartridge according to an embodiment of the invention, an outer surface of the filter material is an effective filtering surface for dust removal, and the binding tapes are arranged at the inner side of the filter material. During the dust removal process, filtering area of an outer surface of a filter paper increases, and the filtering effect is good. Moreover, the filter material is flat in the axial direction, and the dust lacks support in the axial direction of the filter material, which reduces dust accumulation at positions of the binding tapes, improves filtering air volume and reduces a wind resistance of filtering airflow. In addition, when pulse jet is outwardly performed from the inner side of the filter material for blowing off dust, there is less accumulated dust, and the wind resistance to dust-cleaning is small, which reduces maintenance costs.

The above are only preferred embodiments of the invention. It should be noted that a number of improvements and replacements can be made by those of ordinary skill in the art without departing from the technical principles of the invention. These improvements and replacements should also fall into the protection scope of the invention.

What is claimed is:

1. A dust removal filter cartridge, wherein the dust removal filter cartridge includes a filter material and a filter net arranged in the filter material; a top cover is arranged on a top end of the filter material, and an air outlet is provided in the top cover; a bottom end of the filter material is covered with a bottom cover for sealing, an inner side of the filter material is provided with binding tapes which are fixedly connected to the filter material at equal intervals through hot melting;

wherein each binding tape of the binding tapes include a main body arranged at the filter material at equal intervals through hot melting, and two ends of the main body are a first end and a second end going beyond the filter material; the first end is longer than the second end; the first end is connected with a joint of the filter material, and the second end is connected with an inner side of the first end.

2. The dust removal filter cartridge according to claim 1, wherein the first end is connected with the filter material through hot melting, and the second end is connected with the first end and the filter material through hot melting.

3. The dust removal filter cartridge according to claim 1, wherein the filter material is configured as a W-shaped folded filter paper.

4. The dust removal filter cartridge according to claim 1, wherein radial gaps are provided between the filter net and the binding tapes.

5. The dust removal filter cartridge according to claim 1, wherein the binding tapes are arranged at intervals along an axial direction of the filter material, and distances between two adjacent binding tapes are equal.

6. The dust removal filter cartridge according to claim 1, wherein the top cover and the filter material, and the bottom cover and the filter material are respectively bonded and sealed by a glue.

7. The dust removal filter cartridge according to claim 2, wherein the filter material is configured as a W-shaped folded filter paper.

8. The dust removal filter cartridge according to claim 2, wherein radial gaps are provided between the filter net and the binding tapes.

9. The dust removal filter cartridge according to claim 2, wherein a plurality of binding tapes are arranged at intervals along an axial direction of the filter material, and distances between two adjacent binding tapes are equal.

10. The dust removal filter cartridge according to claim 2, wherein the top cover and the filter material, and the bottom cover and the filter material are respectively bonded and sealed by a glue.

\* \* \* \* \*